March 24, 1964  C. BARASSI ETAL  3,126,040
PNEUMATIC TIRES AND ANTI-SKID ELEMENTS THEREFOR
Filed Sept. 4, 1962  2 Sheets-Sheet 1

INVENTORS
CARLO BARASSI
GIULIO CAPPA
BY
STEVENS DAVIS MILLER & MOSHER
ATTORNEYS

March 24, 1964     C. BARASSI ETAL     3,126,040
PNEUMATIC TIRES AND ANTI-SKID ELEMENTS THEREFOR
Filed Sept. 4, 1962

INVENTORS
CARLO BARASSI
GIULIO CAPPA
BY
STEVENS DAVIS MILLER & MOSHER
ATTORNEYS

United States Patent Office 3,126,040
Patented Mar. 24, 1964

3,126,040
PNEUMATIC TIRES AND ANTI-SKID ELEMENTS THEREFOR
Carlo Barassi and Giulio Cappa, Milan, Italy, assignors to Pirelli, S.p.A., Milan, Italy
Filed Sept. 4, 1962, Ser. No. 221,001
Claims priority, application Italy Sept. 8, 1961
6 Claims. (Cl. 152—184)

The present invention relates to pneumatic tires for vehicle wheels and, more particularly, to a tire provided with anti-skid elements which render the tire suitable for travel over extremely slippery surfaces, for example, surfaces formed by ice or compressed snow. This invention also pertains to the anti-skid elements themselves and the means for securing them in combination on the tire.

In the past, a number of proposals have been advanced for the purpose of attempting to solve the problem of vehicle travel over ice or compressed snow. For example, it has been proposed to incorporate folded wire reinforcements in the tread of the tire in such a manner that the outer ends of the folded wires project from the outer surface of the tread thereby tending to penetrated into the ice to achieve a better grip on the surface. However, pneumatic tires of this kind do not solve the problem indicated because it has been ascertained that the projecting ends of the metallic insertions wear out more rapidly than the rubber in the tread such that, after a given period of time, the metallic points no longer project from the tread surface so that the desired effect cannot be obtained.

The use of various types of chains is so well-known that mere mention of the same, without further description, is deemed sufficient. These chains prove to be particularly advantageous for travel over fresh or lightly compressed snow but perform inadequately when traveling on highly compressed snow or on ice.

Another suggested solution is one which involves the use of metallic elements, generally cylindrical received in suitable cavities in the tread. In certain cases, the cavities have the shape of a pit into which the elements are driven or impaled; the anti-skid elements are held in place by the frictional forces between the elements and the walls of the cavity. Alternatively, the cavities can be holes passing through the tread of the carcass, in which case the metallic elements are riveted to the inside of the tire or are fastened by bolts. In the case of the cavities first described above, the metallic elements are not firmly fastened to the tires and can be dislodged therefrom, particularly under the action of the transversal stresses which are generated when the vehicle is going around a curve; in the second instance, the elements are firmly fastened to the tires but, on the other hand, they seriously impair the resistant structure of the tire which already has been weakened by the presence of the holes passing through. Furthermore, in this second instance, the tires cannot be used on normal ground without the metallic elements because of the presence of the holes.

A highly acceptable and satisfactory solution of the general problem involves tires having a removable tread, particularly where the tread comprises a plurality of separate tread rings which are rendered inextensible by means of inner reinforcements. In the latter case, the anti-skid elements have a T-shaped section such that the arms of the T are inserted between the carcass and two adjacent rings, one arm being under one ring and the other arm being under the adjacent ring. Although tires of this description have given excellent results when traveling over ice or compressed snow, the use of metallic elements of this type is possible only in connection with tires having a removable tread of the type described.

Therefore, it is a principal object of the present invention to provide a tire which is capable of traveling over ice or compressed snow and which is devoid of the above-mentioned drawbacks and which, moreover, can be rendered readily serviceable for running over normal ground. The present invention is applicable to tires having a removable tread or having a tread which is integral with the carcass.

A further object of the present invention is to provide a tire for vehicle wheels including anti-skid elements, each having a point capable of penetrating into the ice and characterized in that the elements are inserted between the surface of the tread of the tire and at least two inextensible rings received in suitable responding longitudinal grooves located in the tread. The elements are forced against the rings by the inner-inflation pressure of the tire. Each element, in the portion adapted to contact the tread, is provided with a longitudinal channel having at least one transversal diaphragm or rib, whereas the tread is provided with suitable corresponding projections adapted to be received in the longitudinal channel of the anti-skid element.

In the following description the expression "inextensible ring" refers to a ring whose modulus of elasticity is such that, when the ring is assembled on the tire and the latter is inflated, the tension to which the ring is subjected is sufficient to maintain the anti-skid elements firmly in place against the tread.

In accordance with one form of the present invention, the anti-skid elements are provided with two transversal diaphragms disposed on the opposite ends of the longitudinal channel; thus such a longitudinal channel appears as a cavity shaped in the form of a parallelepiped or in the form of a trapezoidal prism in which the face corresponding to the greater base of the trapezium is directed toward the axis of rotation of the tire. In this form of the invention the tread is provided, of course, with a suitable projection of corresponding shape adapted to be received in the cavity.

In accordance with another form of the present invention, the anti-skid elements are provided with a single transversal diaphragm which interrupts the longitudinal channel at an intermediate point. In this case, the corresponding projection on the tread is provided with a suitable transversal notch in which the diaphragm is received.

In the tire which is provided in accordance with the present invention, the anti-skid elements are applied, or removed, when the tire, is in a deflated condition. When the tire is inflated, it expands, thereby placing the inextensible rings under tension such that the anti-skid elements, which are inserted between the tread and the inextensible rings, are firmly held in place against the tread. Furthermore, the longitudinal channel and the transversal diaphragm or diaphragms prevent any movement of the anti-skid elements even under the action of transversal and longitudinal forces which may be generated when the tire is running on a curve or when the vehicle is accelerating or braking.

In accordance with the present invention, the anti-skid elements are provided with a point, preferably made of a very hard material which is resistant to abrasion. In this respect, the point can be made of a material which is different from that constituting the body of the anti-skid element. Thus, it is possible that the body can be metallic or that the same can be made of another material such as, for example, a suitable plastic material.

Each anti-skid element is provided with a lateral projection on each of its lateral walls, namely on the walls directed toward the tread edges. These projections are inserted between the tread and the inextensible rings, preferably two in number, which are disposed in substantially parallel relation in suitable longitudinal grooves in the tread.

The cross-section of the inextensible rings can have any desired shape but, generally, the shape is circular or roundish and the latter projections of the metallic elements are correspondingly shaped in order to fit into suitable grooves capable of providing support for the inextensible rings.

As stated heretofore, each ring must have such a modulus of elasticity that, when the tire is inflated, the ring is placed under a sufficient tension to hold the elements in place. Thus, the rings can be constituted of threads or cords of metal, cotton, rayon, or by fibers obtained from polyamides, polyesters, polyolefines or other equivalent polymers and, if desired, can be covered with rubber or other suitable materials, such as, for example, nylon or with material sold under the trade name of "Vulkollan."

Further, in accordance with the present invention, the tread of the tire preferably is provided with recesses, having such a size and shape as to receive the anti-skid elements; each recess having one or more projections adapted to be received in a correspondingly shaped cavity in the anti-skid element. In this manner, it is possible to insure that only the point of the anti-skid element will project beyond the outer surface of the tread.

Other and further objects and advantageous features of the present invention will hereinafter more fully appear in connection with a detailed description of the drawings in which FIGURE 1 is a perspective view of a section of a tire of the integral tread type and showing an anti-skid element held in assembled position on the tire by means of two inextensible rings;

Figure 2:
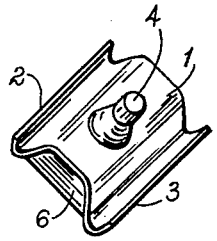
FIGURE 2 is a perspective view of an anti-skid element made in accordance with one embodiment of the invention and as viewed from the top.
Figure 3:
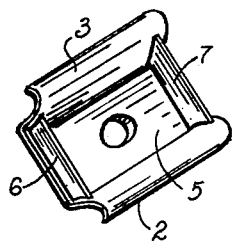
FIGURE 3 is a perspective view of the same element shown in FIGURE 2 but viewed from the bottom or opposite side.

In FIGURES 2 and 3 reference numeral 1 indicates generally the body of an anti-skid element which is provided with two lateral projections 2 and 3. The lateral projections are of suitable curved shape to fit into the grooves (later to be described) and to receive thereover the inextensible rings (later to be described). The anti-skid element 1 is provided with an integral channel or recess 5 which is limited by two transversal ribs or diaphragms 6 and 7. The anti-skid element is further provided with a point 4 made of a very hard metal which is resistant to abrasion, and which is connected integrally in any appropriate manner to the body 1 of the anti-skid element.

Figure 1:
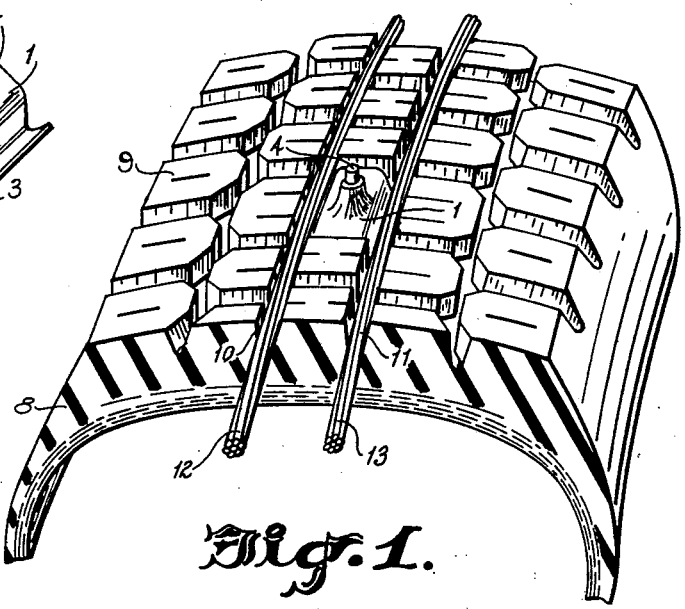

FIGURE 1 shows a tire 8 whose tread portion 9 is integral with the carcass of the tire. In the tread portion there are provided two longitudinally or circumferentially extending grooves 10 and 11 in which are received the inextensible rings 12 and 13, respectively. The anti-skid element 1 is shown positioned on the tire (in a manner later to be described) such that the point 4 projects slightly beyond the outer periphery of the tread 9.

Figure 4:
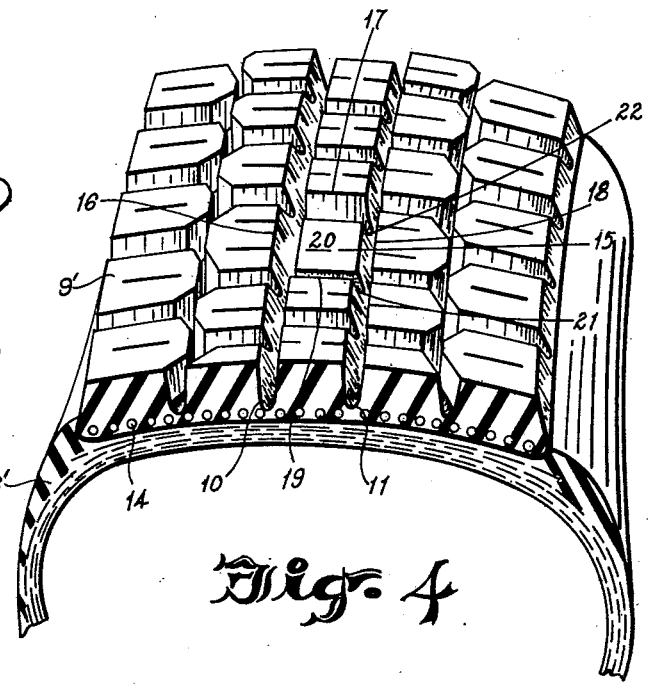
FIGURE 4 is a perspective view of a section of a tire having a separate tread portion, the tread portion showing a suitable recess therein for accommodating the anti-skid element of FIGURES 2 and 3.

FIGURE 4 shows a tire having a carcass 8' and a tread 9', which is separate from the carcass. The tread portion is provided with a plurality of inextensible reinforcing elements 14 which will render the tread portion 9' substantially inextensible in the longitudinal direction. The tread portion is provided with longitudinal grooves 10 and 11 for receiving therein the rings 12 and 13 shown in FIGURE 1. The tread is also provided with a centrally located recess 15, the outer boundaries of which are defined by the four walls 16, 17, 18 and 19. The recess 15 is provided with a projection 20 which is shaped to conform with the channel 5 such that when the element 1 is inserted into the recess 15 and placed downwardly therein, the projection 20 will be received within the channel 5. On opposite sides of the projection 20 (in the longitudinal or circumferential direction) there are provided two relatively narrow slots 21 and 22 adapted to receive therein the diaphragms or ribs 6 and 7, respectively.

Figure 5:
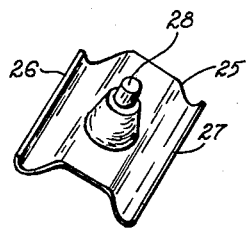
FIGURE 5 is a perspective view similar to FIGURE 2 showing an anti-skid element constructed in accordance with another embodiment of the present invention.
Figure 6:
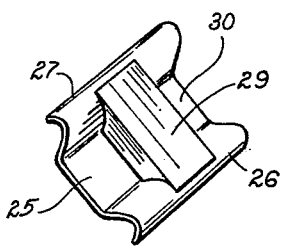
FIGURE 6 is a perspective view of the same element shown in FIGURE 5 but viewed from the bottom or opposite side.

FIGURES 5 and 6 show an anti-skid element 25 similar to the anti-skid element 1 shown in FIGURE 2 and having lateral projections 26 and 27 corresponding to the lateral projections 2 and 3, respectively, described above in connection with FIGURES 2 and 3. The anti-skid element 25 is also provided with a point 28 which is similar in all respects to point 4 previously described. However, the anti-skid element 25 differs from that shown in FIGURES 2 and 3 in that the underside thereof is provided with a transversal diaphragm 29 of moderate width and located substantially centrally with respect to the otherwise continuous channel 30 at the bottom of the anti-skid element 25.

Figure 7:
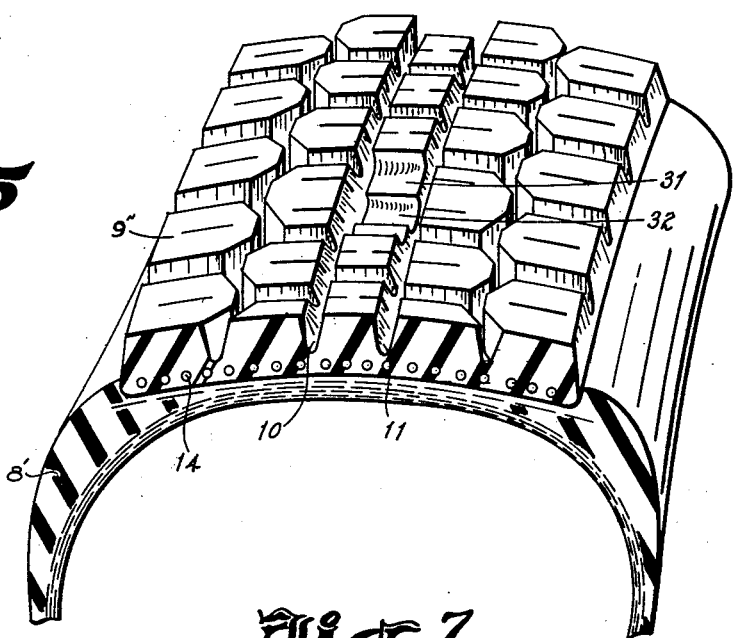
FIGURE 7 is a perspective view of a section of a tire similar to FIGURE 4, the tread portion thereof, however, showing a different recess therein to accommodate the anti-skid element of FIGURES 5 and 6.

FIGURE 7 shows a tire similar to that illustrated in FIGURE 4 including carcass 8' and a separate tread 9'' which correspond generally to members 8' and 9' of FIGURE 4. However, the tread portion of FIGURE 7 has a recess 31 therein which is differently shaped from the recess 15 previously described. The upper surface of the recess 31 is located at an elevation somewhat above the bottoms of the grooves 10 and 11 for the rings 12 and 13, respectively. The recess 31 is further provided with a notch 32 which is shaped similar to the transversal diaphragm 29. When the anti-skid element 25 is inserted in the recess 31 in such a manner that the transversal diaphragm or rib is received in the notch 32 and with the rings 12 and 13 being received in the grooves 10 and 11 over the element 25, the resulting combination will be similar to that shown in FIGURE 1. The separate tread portion 9'' is likewise provided with longitudinal and inextensible reinforcing elements 14.

In using the anti-skid element 1 or 25 in combination with a tire of the type shown in FIGURE 1, the elements are first inserted into the corresponding recesses when the tire is in a deflated condition. Thereafter, the rings 12 and 13 are fitted into the grooves 10 and 11 and the tire is then inflated to the amount desired. The inflation pressure of the tire 8 will place the rings 12 and 13 under sufficient tension that the anti-skid elements 1 or 25 will remain securely located in position. The intermating shape of the anti-skid elements 1 or 25 and the corresponding recesses 15 or 31, respectively, prevent any undesired movement of the anti-skid elements, even when going around curves or under conditions of acceleration or braking.

In connection with the use of anti-skid elements with a tire of the separate tread type as shown in FIGURES 4 and 7, the elements are inserted on the tread portion of 9' or 9'' while the same is removed from the carcass 8'. Thus, with the tread portion in its separated condition, the anti-skid elements 1 or 25 are placed in the corresponding recesses in the tread and thereafter the rings 12 and 13 are slipped over and into the corresponding grooves 10 and 11. Whereas the tread ring 9' or 9'' is relatively longitudinally inextensible by virtue of the inextensible reinforcing elements 14, nevertheless, the tread portion is sufficiently flexible to permit the slipping over of the rings 12 and 13 into the grooves 10 and 11 as described above. After the anti-skid elements and rings 12 and 13 have been assembled on the tread ring 9 or 9', the tread ring, with the elements thus assembled thereon, is inserted on the carcass 8' when the latter is in the deflated condition. Thereafter, the tire is inflated to the proper degree and the tension forces described above will be exerted on the elements 12 or 13 so as to maintain the anti-skid elements in proper position.

Whereas the present invention has been described in particular relation to the drawings attached hereto, it should be understood that other and further modifications, apart from those shown or suggested herein, may be made within the spirit and scope of this invention.

What is claimed is:

1. A pneumatic tire designed for travel on ice, said tire having a tread portion in which are formed at least two parallel and longitudinal grooves, said tread portion also having therein a plurality of circumferentially spaced recesses located between said grooves, a plurality of anti-skid elements received in said recesses, each anti-skid element being provided with a point projecting outwardly beyond the periphery of the tread portion and capable of penetrating into the ice, each anti-skid element having a pair of oppositely disposed lateral projections extending into the longitudinal grooves, at least two inextensible rings received in the longitudinal grooves and overlying the lateral projections of said anti-skid elements to hold the latter in position, each of said anti-skid elements being provided with a longitudinal channel on the inner portion thereof with at least one transversal diaphragm in said channel, each recess of said tread portion being provided with suitable projections extending into and received within the longitudinal channel of the corresponding anti-skid element.

2. The invention as set forth in claim 1 characterized in that the longitudinal channel of each anti-skid element is provided with two transversal diaphragms disposed at the opposite ends of said channel.

3. The invention as set forth in claim 1 characterized in that the longitudinal channel of each anti-skid element is interrupted by a transversal diaphragm disposed at an intermediate point in said channel.

4. An anti-skid element for a pneumatic tire, comprising a body portion, a point projecting upwardly from said body portion, a channel in said body portion and directed upwardly from the bottom of said body portion, lateral and curved extensions projecting outwardly from said body portion at opposite sides thereof and disposed along the bottom of said channel and at least one transversal diaphragm in said channel.

5. The invention as set forth in claim 4 characterized in that said channel is provided by two transversal diaphragms disposed at the opposite ends of said channel.

6. The invention as set forth in claim 4 characterized in that said channel is interrupted by a transversal diaphragm disposed at an intermediate point in said channel.

References Cited in the file of this patent

UNITED STATES PATENTS

| | | |
|---|---|---|
| 1,185,714 | Rich | June 6, 1916 |
| 2,981,302 | Barassi | Apr. 25, 1961 |

FOREIGN PATENTS

| | | |
|---|---|---|
| 534,175 | Germany | Sept. 23, 1931 |